[United States Patent Office — 3,074,945 — Patented Jan. 22, 1963]

3,074,945
NEW ANTHRAQUINONE DYESTUFFS CONTAINING DIAMINO-TRIAZINYLAMINO RADICALS

Max Staeuble and Kurt Weber, Basel, Switzerland, assignors to Ciba Limited, Basel, Switzerland
No Drawing. Filed May 2, 1960, Ser. No. 25,884
Claims priority, application Switzerland May 6, 1959
8 Claims. (Cl. 260—249)

This invention provides valuable anthraquinone vat dyestuffs which are free from salt-forming groups that impart solubility in water and which correspond to the general Formula 1

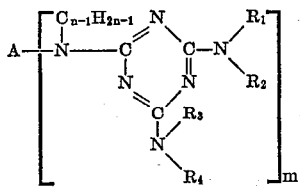

in which A represents a vattable radical, $m$ is a whole number not greater than 4, $n$ is a whole number not greater than 5, at least three of the radicals $R_1$, $R_2$, $R_3$ and $R_4$ represents hydrogen atoms or alkyl or cycloalkyl radicals which may be substituted and one of the said radicals represents a hydrogen atom or an alkyl or cycloalkyl radical which may be substituted or a benzene radical, or the radicals $R_1$ and $R_2$ or $R_3$ and $R_4$ together with the nitrogen atom represent the radical of a heterocyclic ring system, for example, a piperidine or morpholine ring.

As alkyl or cycloalkyl radicals there may be mentioned more especially those containing not more than 6 carbon atoms. The alkyl radicals may be substituted, for example, by halogen atoms or hydroxyl, alkoxy or cyano groups, and are advantageously free from amino groups. As examples of suitable alkyl radicals there may be mentioned the methyl, ethyl, propyl, isopropyl, butyl, β-hydroxyethyl, γ-hydroxypropyl, β-chlorethyl, β-cyanethyl and β-methoxy ethyl groups. As an example of a cycloalkyl radical there may be mentioned the cyclohexyl group. The dyestuffs must be free from salt-forming groups that impart solubility in water, that is to say, sulfonic acid or carboxylic acid groups, or aliphatic amino groups.

This invention also provides a process for the manufacture of the dyestuffs of the above Formula 1 wherein a vattable amine of the Formula 2

(2) 

in which A and $n$ have the meanings given above, is condensed with one molecular proportion of a compound of the Formula 3

(3) 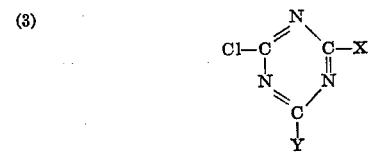

in which X represents a chlorine atom or an amino group or an alkylamino, cycloalkylamino, phenylamino or dialkylamino group which may be substituted, and Y represents a chlorine atom or an amino group or an alkylamino, or cycloalkylamino group, or a dialkylamino group, in which the alkyl groups may be substituted, and when the condensation product so obtained contains 1 or 2 chlorine atoms, the chlorine atom or atoms is or are exchanged for an amino, alkylamino, dialkylamino, hydroxyalkylamino or phenylamino group or groups, and wherein the starting materials are so chosen that the final dyestuff contains not more than one phenylamino group.

As vattable amines there may be used monoamine or diamines, for example, 1-aminoanthraquinone or a simple substitution product thereof, for example, 1-amino-4-methoxy-anthraquinone or a 1-amino-4- or -5- or -8-acylamino-, especially -benzoylamino-, anthraquinone. In the case of a benzoylamino-compound the benzoyl radical may be substituted, for example, by a halogen atom or a methoxy, alkyl, trifluoro methyl, sulfonamido or sulfone group. Furthermore there may be mentioned 1:4-diamino anthraquinone and 2-substitution products thereof, 1:5- or 1:8-diaminoanthraquinone or 1:5-diamino-4:8-dihydroxyanthraquinone. The radical A in the above Formula 1 includes anthraquinone radicals which contain fused carbocyclic or heterocyclic rings for example, 4-aminoanthraquinone - 2:1(N) - acridone, 5-amino - 1:9 - isothiazole - anthraquinone, 4- or 5-amino-anthrapyrimidine, amino-acedianthrones, 4- or 5-amino-1':1-dianthrimidecarbazole, 4- or 5-amino-5'-benzoylamino, dianthrimidcarbazole, 4-amino-4'-benzoylamino-dianthrimidcarbazole, 4 - amino - anthrapyridone, amino-dibenzanthrone, aminoisodibenzanthrone, amino-anthanthrone, aminobenzanthrone, aminoflavanthrone, aminopyranthrone, and also compounds of the formulae

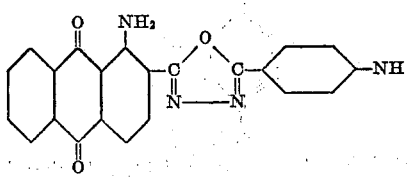

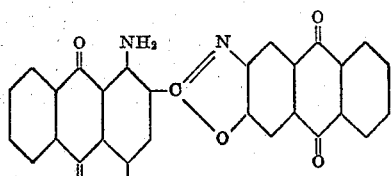

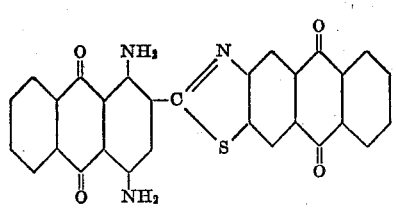

These compounds are condensed with a compound of the Formula 3 for example, with cyanuric chloride. In this case there is obtained a condensation product that contains 2 chlorine atoms in the triazine radical. These chlorine atoms are exchanged for amino groups by reaction with ammonia or aliphatic amines.

The aminoanthraquinones may also be condensed with dichlorotriazines of the Formula 4

(4) 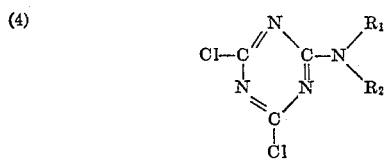

in which $R_1$ and $R_2$ each represent a hydrogen atom or an alkyl group which may be substituted, or not more than one of the radicals $R_1$ and $R_2$ represents a benzene radical. The condensation product so obtained, which contains one chlorine atom bound to the triazine radical, is reacted with ammonia or an aliphatic amine. When $R_1$ and $R_2$ both represent an alkyl radical, the condensation product may be reacted with an aminobenzene.

Finally, the aminoanthraquinones may be reacted with monochlorotriazines of the Formula 5

(5) 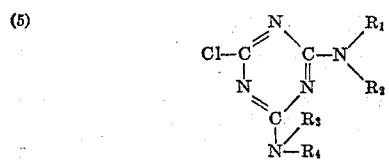

in which $R_1$, $R_2$, $R_3$ and $R_4$ have the meanings given in connection with Formula 1.

The reaction of the aminoanthraquinone with the triazine of the Formula 3 is advantageously carried out in an inert organic solvent, for example, nitrobenzole, chlorobenzole, or ortho-dichlorobenzole at a raised temperature.

In general it is not necessary to isolate the chlorine-containing primary condensation products, so that the two reactions may be carried out in the same vessel.

The dyestuffs so obtained are useful for a very wide variety of purposes, especially as vat dyestuffs, pigments or as dispersion dyestuffs for dyeing synthetic fibers. Depending on the size of the anthraquinone radical or the nature of the substituents in the triazine radical, they are better suited for one purpose than another.

Dyestuffs which contain the radical of the formula

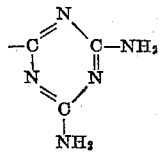

owing to their good fastness to light and migration, are very suitable as pigments. Dyestuffs which contain as the anthraquinone radical one which consists of not more than three benzene nuclei and, as substituents at the amino groups of the triazine radical, alkyl or hydroxyalkyl groups, are useful as dispersion dyestuffs for synthetic fibers, especially fibers of cellulose ester, polyamides, polyacrylonitrile or polyethylene terephthalate.

Of special interest as vat dyestuffs are those anthraquinones of the Formula 1 in which A represents a higher condensed anthraquinone radical, for example, a pyranthrone, acedianthrone, dibenzpyrenquinone, and especially a dibenzanthrone or isodibenzanthrone radical. Dyestuffs which contain the dibenzanthrone radical are vat dyestuffs which dye cellulose fibers valuable deep black tints. Of special interest are dyestuffs of the dibenzanthrone series which contain at least one hydroxyalkylamino group in the triazine radical.

The following examples illustrate the invention, the parts and percentages being by weight:

*Example 1*

9.4 parts of aminodibenzanthrone are suspended with stirring in 200 parts of anhydrous nitrobenzene and heated to 160 to 170° C. A solution of 6 parts of cyanuric chloride in 40 parts of nitrobenzene and thereupon 0.5 part of pyridine are added and the whole is stirred for 12 hours at 170° C., then cooled to room temperature and the cyanuration product of the formula

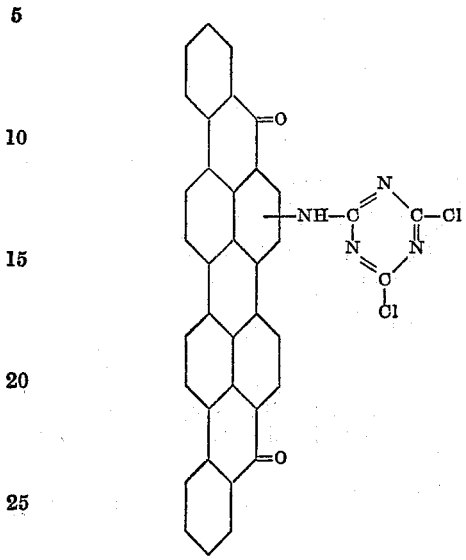

is filtered off and washed with nitrobenzene. The filter cake is added in small portions at 150 to 160° C. to 100 parts of monoethanolamine and the mixture is stirred for another 2 hours at 150° C., then allowed to cool, poured into water, and the dyestuff of the formula

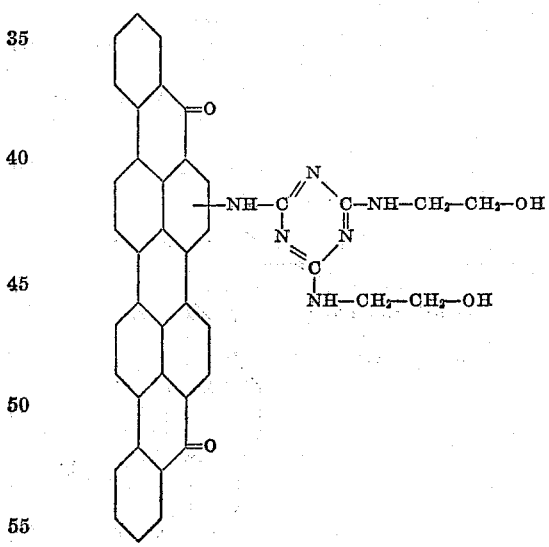

is filtered off, thoroughly washed with water and then with acetone and dried under reduced pressure at 60–70° C.

When dry, the new dyestuff is a black powder which dyes cotton and regenerated cellulose from an alkaline hydrosulfite vat valuable black tints having excellent properties of fastness.

The identical dyestuff is obtained when a suspension, heated at 170° C., of the primary cyanuration product in nitrobenzene is treated dropwise within one hour with 20 parts of monoethanolamine in 20 parts of chloroform and the reaction mixture is stirred on for several hours at 170–180° C.

When the process described in the first paragraph is carried out with N-methyl-aminodibenzanthrone instead of with aminodibenzanthrone, proceeding otherwise in identical manner, a vat dyestuff is obtained which dyes cotton brownish black tints of excellent properties of fastness.

Example 2

The cyanuration product described in the first paragraph of Example 1, in the form of the suction filter cake, is added in small portions to 100 parts of diethanolamine at 150–160° C. with vigorous stirring and the whole is stirred for a further hour. The dyestuff of the formula

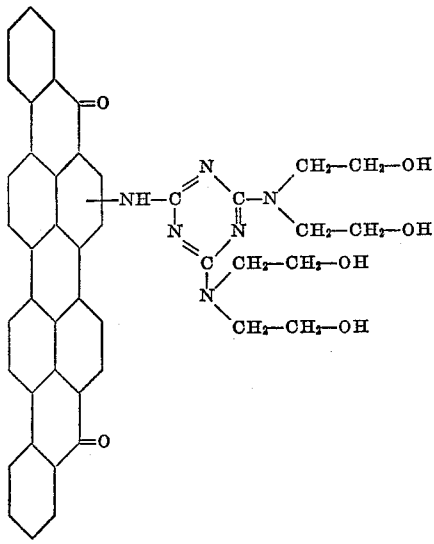

is isolated as described in Example 1; it dyes cotton and regenerated cellulose from a reddish blue hydrosulfite vat full black tints of outstanding properties of fastness.

Example 3

6.2 parts of the dichloro-triazine product of aminodibenzanthrone described in Example 1 are suspended in 200 parts of nitrobenzene and the suspension is heated to 160° C. In the course of 2–3 hours 12 parts of cyclohexylamine are then added dropwise and the mixture is stirred for 6 hours at 150–160° C., allowed to cool, and the dyestuff of the formula

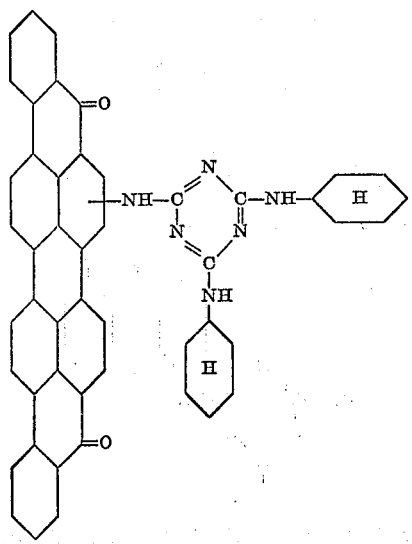

is filtered off, washed with nitrobenzene, then with methanol and finally with water, and dried under reduced pressure at 70–80° C.

The new dyestuff dyes cotton and regenerated cellulose from a reddish blue hydrosulfite vat very fast bluish grey tints.

When in this example, instead of cyclohexylamine, a solution of 5.5 parts of hydroxylamine hydrochloride in 30 parts of pyridine, or 8 parts of hydrazine hydrate in 30 parts of pyridine, is added dropwise, dyestuffs are obtained which have similarly good properties.

Example 4

The dichlorotriazine product of aminodibenzanthrone described in the first paragraph of Example 1, in the form of the filter cake still moist with nitrobenzene, is added in small portions to 100 parts of N-methylethanolamine with vigorous stirring at 140–150° C. and the mixture is stirred for 2 hours at the same temperature. The dyestuff of the formula

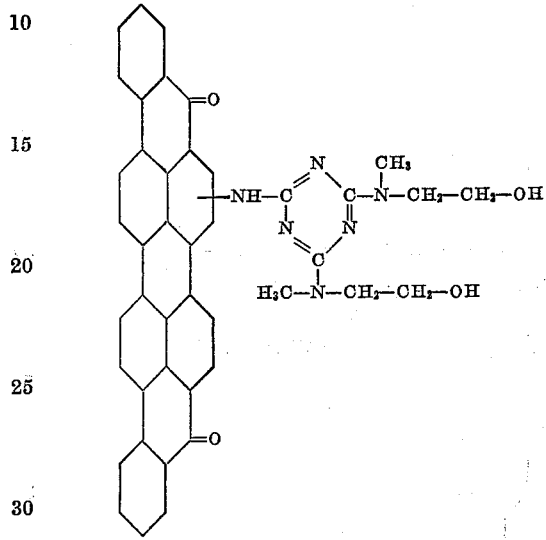

is isolated as described in Example 1; it dyes cotton and regenerated cellulose from a hydrosulfite vat greenish black tints having very good properties of fastness.

Example 5

The dichloro-triazine product of aminodibenzanthrone described in the first paragraph of Example 1, in the form of the filter cake, is suspended in an autoclave in 200 parts of nitrobenzene and 20 parts of diethylamine and the whole is heated for 12 hours at 100–110° C. The dyestuff of the formula

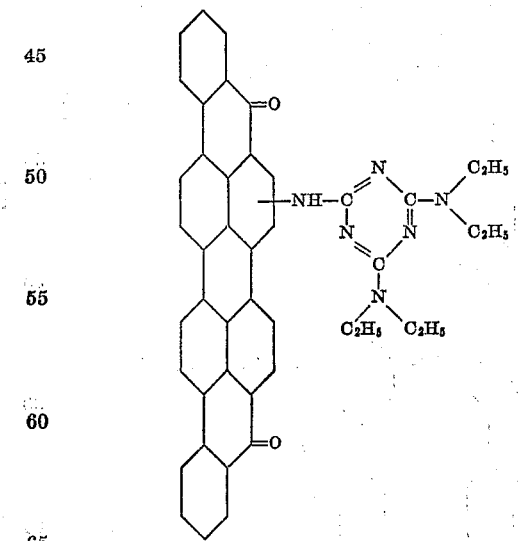

is filtered off, washed with nitrobenzene, then with methanol and finally with water, and dried under reduced pressure.

The new dyestuff dyes cotton and regenerated cellulose from an alkaline hydrosulfite vat very fast bluish grey to bluish black tints.

When in the above example instead of diethylamine, ammonia is injected in the autoclave up to a pressure of 6–8 atmospheres gauge, the resulting dyestuff has similar properties.

Example 6

A suspension of 6.7 parts of the dyestuff described in Example 1 in 100 parts of nitrobenzene is treated with 6 parts of thionyl chloride; 0.1 part of pyridine is added and the whole is stirred for 6 hours at 140–150° C., allowed to cool and the dyestuff is filtered off, washed with nitrobenzene and dried under reduced pressure at 70° C.

This dyestuff dyes cotton and regenerated cellulose distinctly more bluish black tints than the dyestuff described in Example 1 and probably corresponds to the following formula

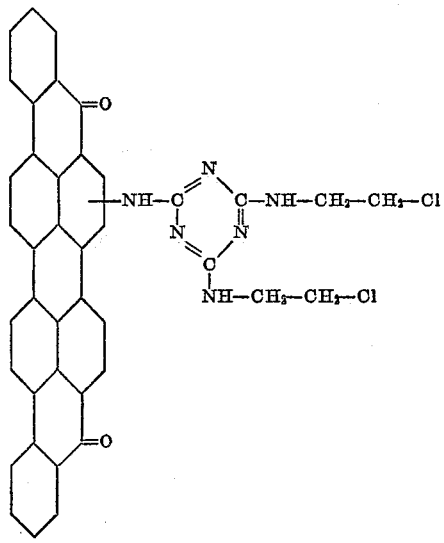

Example 7

A suspension of 9.4 parts of aminodibenzanthrone in 200 parts of anhydrous nitrobenzene is heated to 160–170° C. A warm solution of 7.6 parts of 2-N-methylanilino-4:6-dichloro-1:3:5-triazine in 50 parts of nitrobenzene is added, and in the course of one hour 2.24 parts of N-dimethylaniline are slowly and vigorously stirred in dropwise. The mixture is stirred on for 7 hours at 190–200° C., cooled to room temperature, filtered, and the filter residue is washed with nitrobenzene on the filter. The filter cake is then added in small portions to 100 parts of boiling monoethanolamine and stirred on for 2 hours, the whole is poured into water, and the dyestuff of the formula

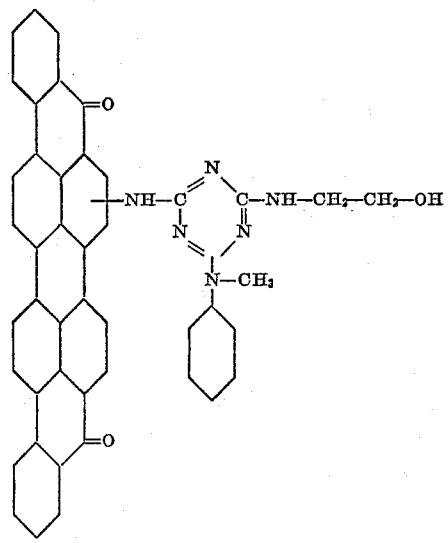

is filtered off, washed until neutral and dried under reduced pressure at 70–80° C.

The new dyestuff dyes cotton and regenerated cellulose from a hydrosulfite vat black tints having excellent properties of fastness.

When in this example instead of 7.6 parts of 2-N-methylanilino-4:6-dichloro-1:3:5-triazine an equimolecular amount of 2-cyclohexylamino-4:6-dichloro-1:3:5-triazine is used, the resulting dyestuff has similarly good properties.

Example 8

9.4 parts of aminodibenzanthrone are reacted with 5.8 parts of 2-dimethylamino-4:6-dichloro-1:3:5-triazine in nitrobenzene as described in Example 7, treated with monoethanolamine, and the reaction product is isolated.

The dyestuff of the formula

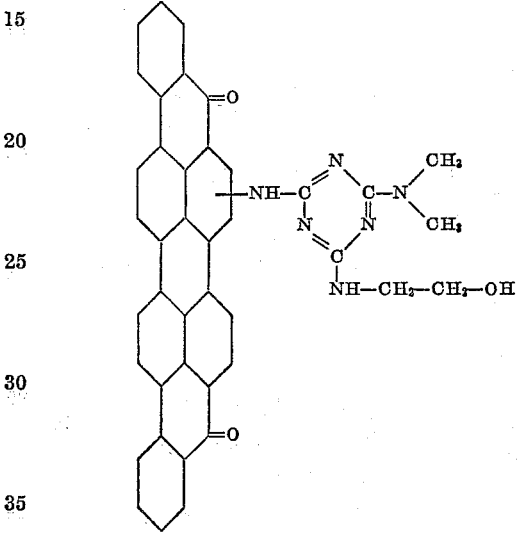

dyes cotton and regenerated cellulose from a hydrosulfite vat reddish black tints having excellent properties of fastness.

When in this example the 5.8 parts of 2-dimethylamino-4:6-dichloro-1:3:5-triazine are replaced by an equimolecular amount of 2-diethylamino-4:6-dichloro-1:3:5-triazine, a dyestuff is obtained which has similar properties.

Example 9

50.4 parts of 5-amino-1:9-isothiazole-anthrone are condensed in 500 parts of nitrobenzene with 74 parts of cyanuric chloride as described in Example 13 and the resulting product is reacted with ammonia in 1200 parts of nitrobenzene as described in the second paragraph of Example 12 to yield a dyestuff of the formula

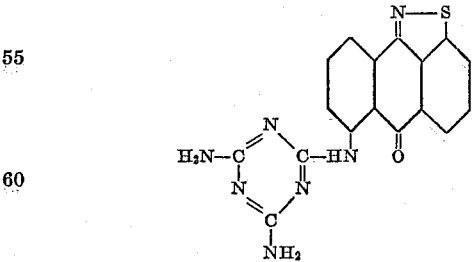

which produces in plasticized polyvinyl chloride orange dyeings of excellent fastness properties.

Example 10

A mixture of 23 parts of 5:5'-diamino-1:1'-dianthrimide carbazole, 600 parts of nitrobenzene and 37 parts of cyanuric chloride is heated for 20 hours at 160° C. After 4 hours the reaction mixture is treated with 1 part of pyridine, allowed to cool and the reaction product is filtered off, washed with nitrobenzene and chloroform, and dried under reduced pressure at 100° C.

70 parts of the resulting condensation product in 1200 parts of nitrobenzene are condensed with ammonia as described in the second paragraph of Example 12, to yield a dyestuff of the probable formula

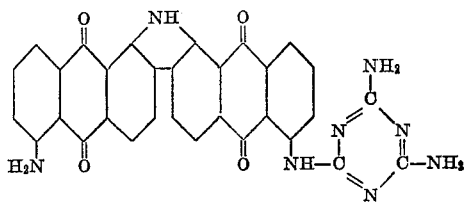

which produces on cotton and regenerated cellulose from an alkaline hydrosulfite vat fast rust-brown dyeings.

*Example 11*

A mixture of 28.5 parts of bis-para-aminophenylimide of perylene-tetracarboxylic acid, 1000 parts of nitrobenzene, 38 parts of cyanuric chloride and 1 part of dimethyl formamide is heated for 17 hours at 190–195° C. and then for 4 hours at 200–205° C., allowed to cool to 50° C. and filtered. The filter residue is washed with nitrobenzene and acetone and dried under reduced pressure at 60–70° C.

16 parts of the resulting condensation product are reacted with ammonia in 1000 parts of nitrobenzene as described in the second paragraph of Example 12, to yield a dyestuff of the formula

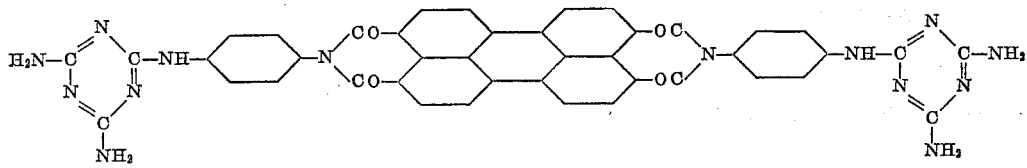

which dyes cotton and regenerated cellulose from analkaline hydrosulfite vat fast red tints. In plasticized polyvinyl chloride the dyestuff produces red dyeings having good fastness properties.

*Example 12*

22.9 parts of bis-meta-aminophenylimide of perylene-tetracarboxylic acid in 1000 parts of nitrobenzene are condensed with 22 parts of cyanuric chloride as described in the first paragraph of Example 18. 5 parts of the resulting condensation product in 200 parts of nitrobenzene are stirred with 4.2 parts of N-methylethanolamine for 7 hours at 150–160° C., allowed to cool and suction-filtered. The filter residue is washed with nitrobenzene, alcohol and water, and dried under reduced pressure at 100° C., to yield a dyestuff of the formula

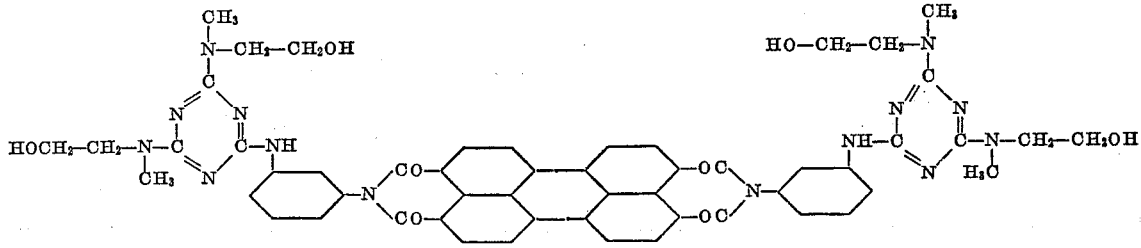

which produces on cotton and regenerated cellulose from an alkaline hydrosulfite vat strong red dyeings having good fastness properties.

When the condensation is performed with monoethanolamine or diethanolamine instead of with N-methylethanolamine dyestuffs are obtained having similar properties.

*Example 13*

15 parts of aminoacedianthrone are condensed in 250 parts of nitrobenzene with 13 parts of cyanuric chloride as described in Example 13 and the resulting product is reacted with ammonia in 500 parts of nitrobenzene as described in the second paragraph of Example 12, to yield a dyestuff of the formula

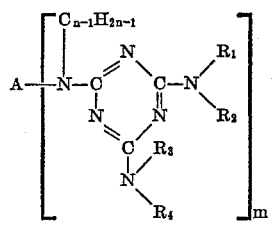

which produces on cotton and regenerated cellulose from an alkaline hydrosulfite vat fast brown tints.

What is claimed is:
1. An anthraquinone vat dyestuff which is free from salt-forming groups imparting solubility in water and which has the formula

$$\left[ A - N - C \overset{N}{\underset{N}{\bigcirc}} C - N \overset{R_1}{\underset{R_2}{\diagdown}} \right]_m$$

in which A represents a member selected from the group consisting of pyranthronyl, acedianthrone, dibenzpyrenquinone, dibenzanthronyl and isodibenzanthronyl, $m$ is a whole number of at most 2, $n$ a whole number of at most 5, at least 3 of the radicals $R_1$, $R_2$, $R_3$ and $R_4$ represent members selected from the group consisting of hydrogen, lower alkyl, lower hydroxyalkyl, lower chloroalkyl and cyclohexyl and one of the said substituents represents a member selected from the group consisting of hydrogen, lower alkyl, lower hydroxyalkyl, lower chloroalkyl, cyclohexyl and phenyl.

2. An anthraquinone vat dyestuff which is free from salt-forming groups imparting solubility in water and which is of the formula

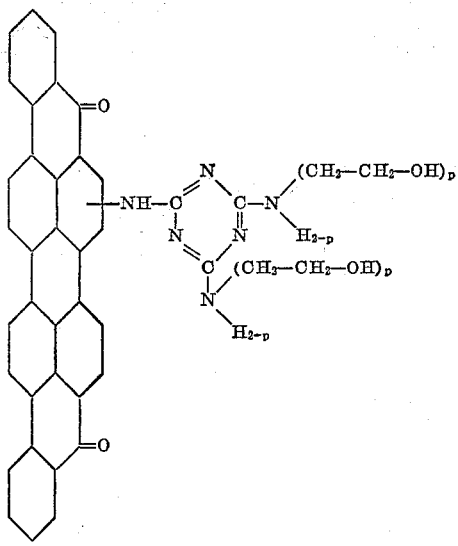

in which p is a whole number from 1 to 2.

3. The dyestuff of the formula

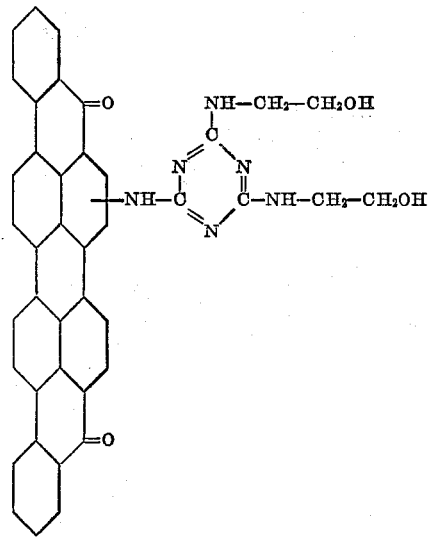

4. The dyestuff of the formula

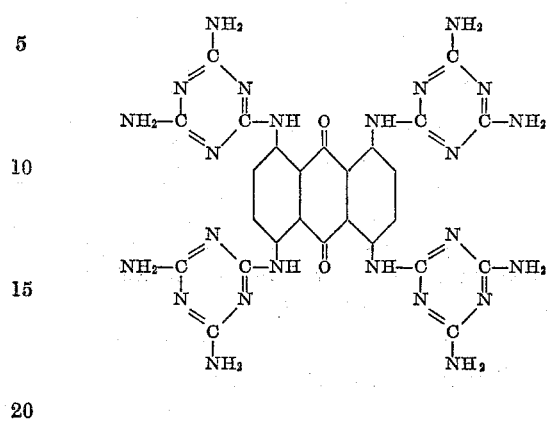

5. The dyestuff of the formula

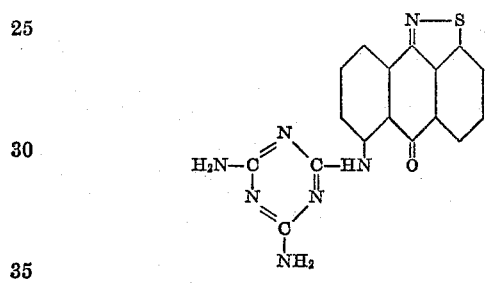

6. The dyestuff of the formula

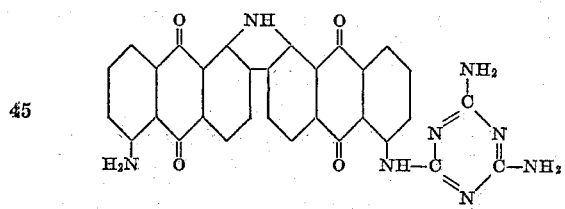

7. The dyestuff of the formula

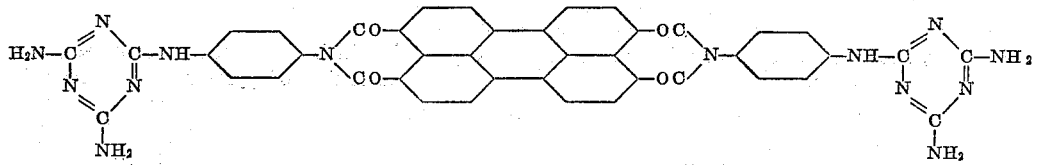

8. The dyestuff of the formula

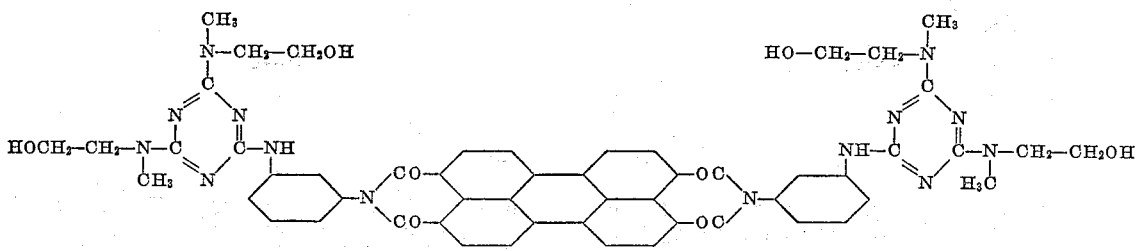

References Cited in the file of this patent

UNITED STATES PATENTS

| | | |
|---|---|---|
| 1,437,783 | Steinbuch et al. | Dec. 5, 1922 |
| 1,523,308 | Steinbuch et al. | Jan. 13, 1925 |
| 2,742,466 | Randall et al. | Apr. 17, 1956 |
| 2,914,531 | Staeuble et al. | Nov. 24, 1959 |

OTHER REFERENCES

Thurston et al.: Journ. of the Am. Chem. Soc., vol. 73, page 2993 (middle of col. 1, cpd. VII) (1951).

UNITED STATES PATENT OFFICE
CERTIFICATE OF CORRECTION

Patent No. 3,074,945                        January 22, 1963

Max Staeuble et al.

It is hereby certified that error appears in the above numbered patent requiring correction and that the said Letters Patent should read as corrected below.

Column 7, Example 7, the right-hand side of the formula should appear as shown below instead of as in the patent:

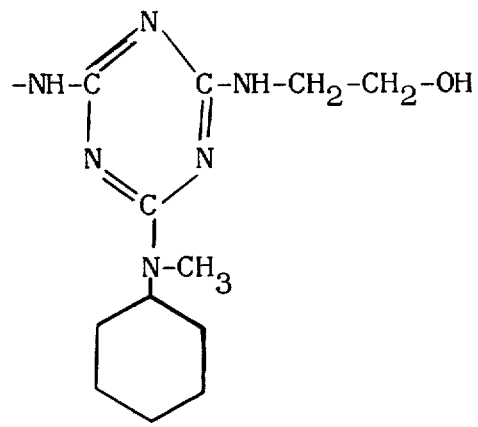

Signed and sealed this 29th day of October 1963.

(SEAL)
Attest:
ERNEST W. SWIDER
Attesting Officer

EDWIN L. REYNOLDS
Acting Commissioner of Patents